(12) United States Patent
Watanabe et al.

(10) Patent No.: US 6,352,329 B1
(45) Date of Patent: Mar. 5, 2002

(54) INK JET RECORDING APPARATUS

(75) Inventors: Hidehiro Watanabe, Tokyo; Atsushi Kubota, Shizuoka-ken, both of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/316,103

(22) Filed: May 24, 1999

(30) Foreign Application Priority Data

May 28, 1998 (JP) .......................................... 10-146975

(51) Int. Cl.[7] .............................. B41J 2/205; B41J 2/155
(52) U.S. Cl. ......................................... 347/15; 347/42
(58) Field of Search ..................... 358/1.9, 298; 400/82; 347/15, 42, 37, 19, 14

(56) References Cited

U.S. PATENT DOCUMENTS

| 4,742,400 A | 5/1988 | Tsuji ........................... 358/284 |
| 5,729,277 A | 3/1998 | Morrison ..................... 347/248 |
| 6,244,681 B1 * | 6/2001 | Yano et al. .................... 347/15 |

FOREIGN PATENT DOCUMENTS

| EP | 0 527 610 A2 | 2/1993 | ............ H04N/1/40 |
| EP | 0 693 380 A1 | 1/1996 | ............ B41J/2/515 |
| EP | 0693380 A1 * | 1/1996 | ............ B41J/2/515 |
| JP | 4-363256 | 12/1992 | .............. B41J/2/21 |
| JP | 6-155771 | 6/1994 | .............. B41J/2/21 |
| JP | 10-795 | 1/1998 | .............. B41J/5/21 |

* cited by examiner

Primary Examiner—John Barlow
Assistant Examiner—Juanita Stephens
(74) Attorney, Agent, or Firm—Frishauf, Holtz, Goodman, Langer & Chick, P.C.

(57) ABSTRACT

In accordance with the dither matrix position signal from the dither matrix position signal generating unit, the dither matrix circuits supply respectively corresponding threshold signals to the selector. When the pixel of interest of the input image signal corresponds to two ink outlet ports at each end portion of the head units to be corrected, the selector selects the threshold signal from the end portion dither matrix circuit that is set for the end area, in accordance with the dither matrix selection signal from the dither matrix selection signal generating unit. Therefore, the comparator compares the input image signal with the threshold signal from the end portion dither matrix circuit and converts it into an N-valued signal.

8 Claims, 5 Drawing Sheets

| 7 | 8 | 9 | 10 |
|---|---|---|---|
| 6 | 1 | 2 | 11 |
| 5 | 4 | 3 | 12 |
| 16 | 15 | 14 | 13 |

FIG. 6A

| 23 | 24 | 25 | 26 |
|---|---|---|---|
| 22 | 17 | 18 | 27 |
| 21 | 20 | 19 | 28 |
| 32 | 31 | 30 | 29 |

FIG. 6B

| 39 | 40 | 41 | 42 |
|---|---|---|---|
| 38 | 33 | 34 | 43 |
| 37 | 36 | 35 | 44 |
| 48 | 47 | 46 | 45 |

FIG. 6C

| 55 | 56 | 57 | 58 |
|---|---|---|---|
| 54 | 49 | 50 | 59 |
| 53 | 52 | 51 | 60 |
| 64 | 63 | 62 | 61 |

FIG. 6D

| 7 | 8 | 9 | 10 |
|---|---|---|---|
| 6 | 1 | 2 | 11 |
| 5 | 4 | 3 | 12 |
| 16 | 15 | 14 | 13 |

FIG. 7A

| 23 | 24 | 25 | 26 |
|---|---|---|---|
| 22 | 17 | 34 | 27 |
| 21 | 20 | 19 | 28 |
| 48 | 31 | 30 | 29 |

FIG. 7B

| 39 | 40 | 41 | 42 |
|---|---|---|---|
| 54 | 33 | 50 | 43 |
| 37 | 36 | 35 | 44 |
| 63 | 47 | 62 | 45 |

FIG. 7C

| 55 | 56 | 57 | 58 |
|---|---|---|---|
| 64 | 49 | 64 | 59 |
| 53 | 52 | 51 | 60 |
| 64 | 63 | 64 | 61 |

FIG. 7D

INK JET RECORDING APPARATUS

BACKGROUND OF THE INVENTION

The present invention relates to an ink jet recording apparatus using an ink jet head on which a large number of ink outlet ports are aligned to execute recording by driving the ink jet head in accordance with an image signal and by selectively discharging the ink from each of the ink outlet ports onto a recording medium.

As the ink jet recording apparatus, for example, an on-demand type ink jet printer is well known. In such an ink jet printer, improvement for acceleration is considered important. As the number of ink outlet ports of the ink jet head is increased, printing can be executed at a higher speed. As for the technique of increasing the number of ink outlet ports, an elongated ink jet head is formed by integrally arranging a plurality of head units each having a large number of ink outlet ports aligned thereon so that the alignment of the ink jet heads can be approximately parallel. Thus, the length of the head becomes a line head by corresponding to the width of a recording sheet, and thereby high-speed printing can be realized.

Incidentally, the head unit comprises a nozzle portion 2 in which a large number of ink chambers 1 are formed, a main body portion 4 in which a common ink chamber 3 feeding the ink into each of ink chambers 1 is provided, and an ink feed passage 5 through which the ink is fed to the common ink chamber 3, as shown in FIG. 10. Ink drops are discharged from ink outlet ports 6 of the ink chambers 1 by bringing the change of volume into the ink chambers 1, and dot printing is thereby executed. The ink consumed in the ink chambers 1 is supplemented from the common ink chamber 3. The control system giving the change of volume into the ink chambers 1 is exemplified by piezoelectric control using distortion of an piezoelectric member, thermal control using heat of an heating element, and the like. The on-demand type printing can be executed by arbitrarily bringing the change of volume into each of ink chambers by the control systems.

Incidentally, the change of volume in the ink chambers 1 during the ink discharging operation is transmitted into the ink chambers as the change of pressure and also propagated into the common ink chamber 3. When the ink is discharged from a plurality of ink chambers, the ink chambers 1 near the end portions of the ink jet head are largely influenced by the common ink chamber 3 and the volume of the ink discharged from a constant number of ink chambers 1 at the end portions is increased or decreased, which depends on the structure of the ink jet head.

In the ink jet head constituted by a single head unit, even if such a phenomenon occurs, i.e. if the volume of the ink discharged from a constant number of ink chambers at the end portions is changed and thereby the change of optical density slightly occurs, unevenness of the optical density is hardly noticed since the printed portion is located at the end portion.

However, in the case of the ink jet head on which a plurality of head units are integrally aligned, the end portions of the head units are positioned in the middle of the line direction of printing. If the unevenness of optical density occurs at the portions, stripe-shaped unevenness of optical density is noticed.

For example, when printing is executed on the basis of an image signal of a constant value by using an ink jet head on which three head units 71, 72 and 73 are integrally aligned, as shown in FIG. 11, the volume of the discharged ink is increased and the optical density of printing is made higher at the boundaries of the head units 71, 72 and 73, and these portions are seen as the stripe-shaped unevenness of optical density. This problem also occurs when the printing is executed on the basis of a general image signal that is not the image signal of a constant value. This stripe-shaped unevenness of optical density does not occur only at the end portions of the head units, but also occurs by irregularity of the ink outlet ports of the ink chambers that is generated during the production of the head units. Thus, in the conventional ink jet head, partial change of the optical density occurs, which appears as the stripe-shaped unevenness of optical density.

Incidentally, in the ink jet head, an image can be only expressed by the ink discharged from one ink chamber, with the number of gradation N as compared with the number of gradation M (M>N≧2) of the input image signal. For this reason, when the number of gradation M is converted into the number of gradation N, pseudo-halftone processing such as the error diffusion method, the dither method and the like needs to be executed. In general, according to the error diffusion method, as compared with the dither method, an image of higher quality can be obtained while the processing speed is low and the circuit dimensions are increased. Therefore, the dither method is often employed when an image of much higher quality is not required. Further, when the optical density is corrected by employing the error diffusion, an error signal for the ink outlet ports to be corrected influences the ink outlet ports that do not have to be corrected, the effect of correction becomes inadequate and deterioration of images is generated. Thus, the error diffusion is not suitable for this kind of correction of the optical density.

BRIEF SUMMARY OF THE INVENTION

Therefore, the object of the present invention is to provide an ink jet recording apparatus capable of reducing the unevenness of optical density caused by change of the ink discharged from the ink outlet ports in a specific area of the ink jet head and thereby improving the quality of images.

According to claim 1, the present invention provides an ink jet recording apparatus comprising: an ink jet head formed by integrally arranging a plurality of head units each having a large number of ink outlet ports aligned, so that the ink outlet ports in each of the head units can be arranged approximately parallel; a pseudo-halftone processing unit for converting an image signal of M gradation into an image signal of N gradation (M>N) by using dither matrix, so that average optical density of an image area formed in accordance with an image signal corresponding to P number of ink outlet ports at each end portion of the head units constituting the ink jet head can be substantially equivalent to average optical density of an image area formed in accordance with an image signal corresponding to ink outlet ports other than the P number of ink outlet ports; and driving means for driving the ink jet head in accordance with the image signal of N gradation that is output from the pseudo-halftone processing unit, while moving a recording medium in a direction orthogonal with a line direction in which the ink outlet ports of the ink jet heads are aligned, relatively to the ink jet head.

According to the invention of claim 1, the unevenness of optical density caused by change of the ink discharged from the ink outlet ports in a specific area of the ink jet head can be reduced and thereby the quality of images can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6D are views showing arrangements of dither matrix of a basic dither matrix circuit in the first embodiment;

FIGS. 7A to 7D are views showing arrangements of dither matrix of an end portion dither matrix circuit in the first embodiment;

DETAILED DESCRIPTION OF THE INVENTION

The embodiments of the present invention will be explained below with reference to the figures.

(First Embodiment)

Figure 1:
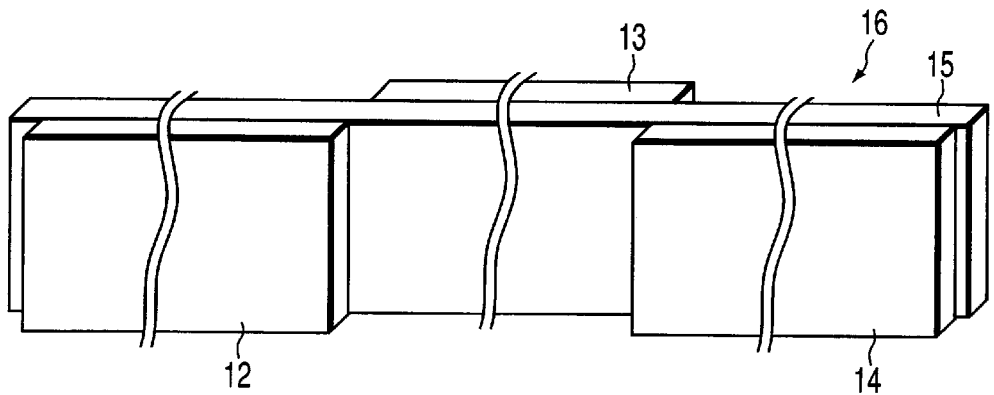
FIG. 1 is a perspective view showing an outer appearance of an ink jet head used in the first embodiment of the present invention.
Figure 2:
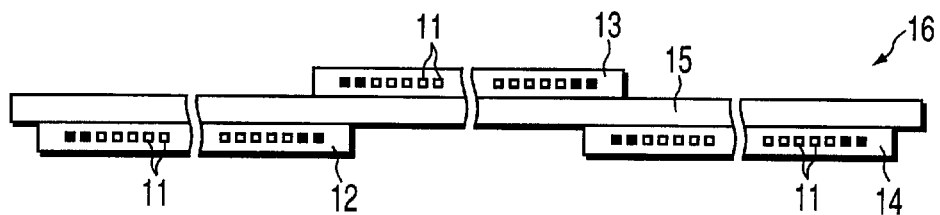
FIG. 2 is a view showing the positional relationship among ink outlet ports in each head unit of the ink jet head used in the first embodiment.

Three head units 12, 13 and 14 having a number of ink outlet ports 11 arranged are applied to both sides of a common board 15, i.e. the head unit 13 on a central portion of one surface thereof, the head units 12 and 14 on end portions of the other surface thereof, to constitute an ink jet head 16, as shown in FIGS. 1 and 2. A distance between the ink outlet port on the most outer side in each of the head units 12, 13 and 14 and the own end of the head unit is longer than a distance between two of the ink outlet ports. If the head units 12, 13 and 14 were simply arranged in a straight line, the distance between the ink outlet ports of the head units would be longer, and they could not be used as a single ink jet head. For this reason, the head units 12, 13 and 15 are alternately arranged on both sides of the common board 15.

Therefore, the distance between the ink outlet port 11 at the most outer end on one side of the head unit 12 and the ink outlet port 11 at the most outer end on one side of the head unit 13, and the distance between the ink outlet port 11 at the most outer end on the other side of the head unit 13 and the ink outlet port 11 at the most outer end on one side of the head unit 14, are equivalent to the distance between two of the ink outlet ports 11 in each of the head units 12, 13 and 14.

In this case, the ink outlet ports 11 of the head units 12 and 14, and the ink outlet ports 11 of the head unit 13 are not aligned in a straight line. However, when the ink outlet timing of the head units 12 and 14 and that of the head unit 13 are adjusted, the same results of printing as those obtained when the ink outlet ports 11 of the head units 12, 13 and 14 are aligned in a straight line, can be easily obtained. Therefore, the ink outlet ports 11 of the head units 12, 13 and 14 are assumed to be aligned in a straight line during the operations.

Figure 5:
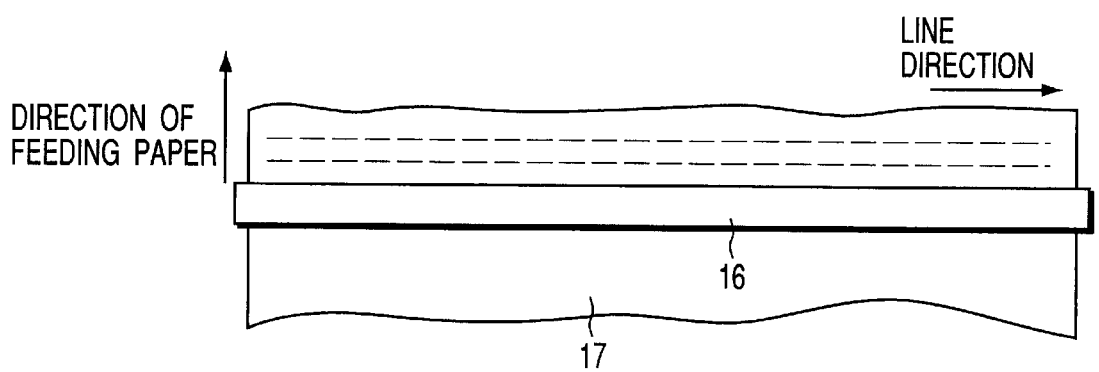
FIG. 5 is a view showing a relationship between the arrangement of the ink jet head and a direction of feeding recording paper in the first embodiment.

The ink jet head 16 is driven in accordance with image signals while feeding paper sheets in a direction orthogonal with a line direction which is a direction of alignment of the ink outlet ports of the ink jet head 16, as shown in FIG. 5, and recording is executed by selectively discharging inks from the ink outlet ports onto recording paper 17 serving as a recording medium. Reversely, the recording paper 17 may be fixed and the ink jet head 16 may be moved to execute the recording.

Figure 3:
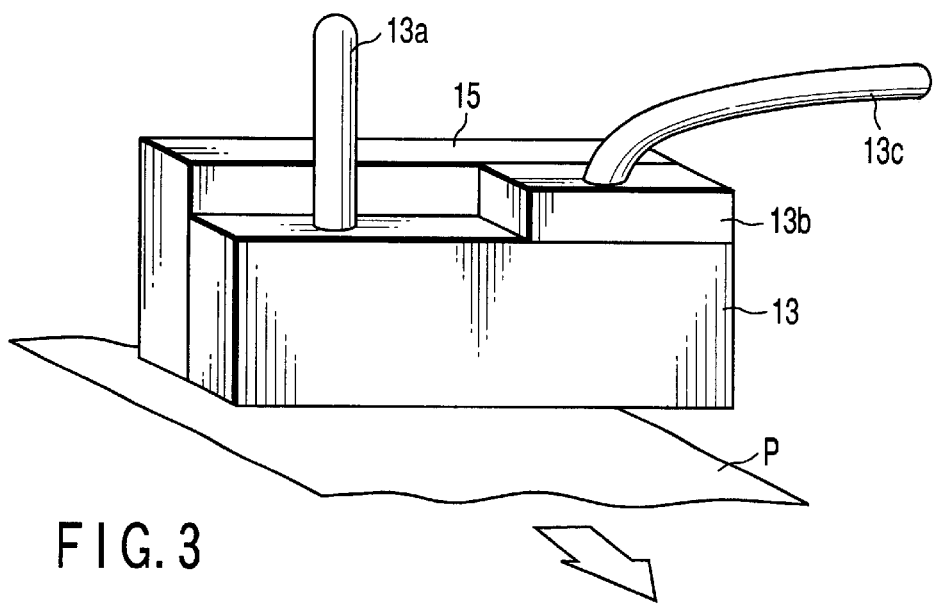
FIG. 3 is a perspective view showing the structure of the head unit.

Next, the perspective view of FIG. 3 showing the only head unit 13 will be explained.

The head unit 13 in which a number of ink chamber are arranged is fixed on one side surface of the board 15.

An ink supply tube 13a is connected to the head unit 13.

In addition, a connector 13b is mounted on a part of the head unit 13. A cable 13c is connected to the connector 13b. The drive voltage is output to the head unit 13 via the cable 13c. P represents a recording medium.

The perspective view of the head unit 13 has been explained, but the structure of the head units 12 and 14 is the same as this.

Figure 4:
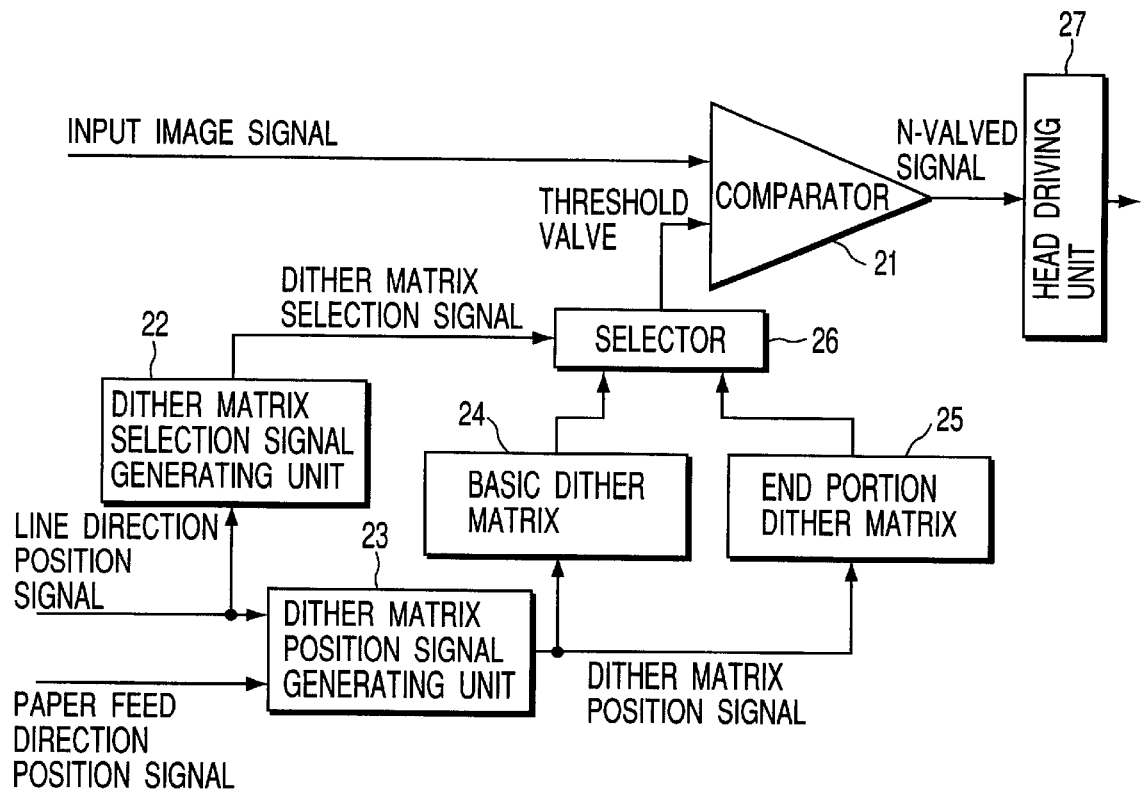
FIG. 4 is a block diagram showing a circuit arrangement of a pseudo-halftone processing unit in the first embodiment.

FIG. 4 is a block diagram showing a circuit arrangement of a pseudo-halftone processing unit for converting an input image signal of M gradation into N value (M>N), for example, into five-valued signal of 0, 1, 2, 3 and 4. 21 denotes a comparator for comparing the input image signal with a threshold value signal and outputting an N-valued signal. 22 is a dither matrix selection signal generating unit for discriminating whether or not a pixel of interest to be printed is at the end portion by receiving a line direction position signal, and outputting a dither matrix selection signal representing the selected dither matrix. 23 is a dither matrix position signal generating unit for receiving the line direction position signal and a paper feed direction position signal and outputting a dither matrix position signal representing the position in the dither matrix. 24 is a basic dither matrix circuit for determining a threshold signal to be output in response to the dither matrix position signal from the dither matrix position signal generating unit 23. 25 is a end portion dither matrix circuit for determining a threshold signal to be output in response to the dither matrix position signal from the dither matrix position signal generating unit 23. 26 is a selector for selecting the threshold signals from the dither matrix circuits 24 and 25 in response to the dither matrix selection signal from the dither matrix selection signal generating unit 22 and supplying the selected threshold signal to the comparator 21. 27 is a head driving unit for driving the ink jet head 16 on the basis of the N-valued signal output from the comparator 21.

The basic dither matrix circuit 24 forms four dither matrix in one set, and each dither matrix is a threshold matrix in a magnitude of 4×4 which gradually expands from the central portion, as shown in FIGS. 6A to 6D. The end portion dither matrix circuit 25 forms four dither matrix in one set, and each dither matrix is a threshold matrix in a magnitude of 4×4 which is partially changed as compared with the dither matrix of the basic dither matrix circuit 24 so as to correct unevenness of optical density, as shown in FIGS. 7A to 7D.

Next, the operations will be explained. A case where the volume of the ink discharged from the two ink outlet ports 11 at each end portion of the head units 12, 13 and 14 is increased, i.e. the volume of the ink discharged from the four ink outlet ports 11 at the boundary portion of the head units is increased as shown by dots in FIG. 2 and thereby the printing optical density at this portion is increased, is assumed here.

First, the line direction position signal representing the position of the line direction of a five-valued pixel of interest is input to the dither matrix selection signal generating unit 22. The dither matrix selection signal generating unit 22 discriminates whether or not pixels of interest from the line direction position signal correspond to two ink outlet ports 11 at each of both end portions of the head units 12, 13 and 14, allows the selector 26 to select the threshold signal from the end portion dither matrix circuit 25 if the pixels of interest correspond to the two ink outlet ports 11 at both end portions thereof, and generates the dither matrix selection signal to allows the selector 26 to select the threshold signal from the basic dither matrix circuit 24 and supplies it to the selector 26 if the pixels do not correspond thereto.

In addition, the line direction position signal representing the position of the five-valued pixel of interest in the line direction, and the paper feed direction position signal representing the position of the paper feed direction, are input to the dither matrix position signal generating unit 23. The dither matrix position signal generating unit 23 generates the dither matrix position signal representing which position of the dither matrix corresponds to the pixel of interest in accordance with the two input position signals, and supplies it to the basic dither matrix circuit 24 and the end portion dither matrix circuit 25. Thus, the dither matrix circuits 24 and 25 supply the respectively corresponding threshold signals to the selector 26.

For example, when the dither matrix position signal represents a position at a lower left corner in the dither matrix, the basic dither matrix circuit 24 outputsy threshold signals '16', '32', '48' and '64' as shown in FIGS. 6A to 6D, and the end portion dither matrix circuit 25 outputs threshold signals '16', '48', '63' and '64' as shown in FIGS. 7A to 7D.

The selector 26 selects the threshold signals from the basic dither matrix circuit 24 or those from the end portion dither matrix circuit 25 in accordance with the dither matrix selection signal. Comparing the input image signal with the threshold signals, the comparator 21 outputs '0' as the N-valued signal if the input image signal is smaller than the threshold value of FIG. 6A or 7A, outputs '1' as the N-valued signal if the input image signal is larger than the threshold value of FIG. 6A or 7A and smaller than threshold value of FIG. 6B or 7B, outputs '2' as the N-valued signal if the input image signal is larger than the threshold value of FIG. 6B or 7B and smaller than threshold value of FIG. 6C or 7C, outputs '3' as the N-valued signal if the input image signal is larger than the threshold value of FIG. 6C or 7C and smaller than threshold value of FIG. 6D or 7D, and outputs '4' as the N-valued signal if the input image signal is larger than the threshold value of FIG. 6D or 7D.

For example, in a case where the input image signal has the position corresponding to the lower left corner of the dither matrix and its value is '40', if it corresponds to the ink outlet ports other than the two ink outlet ports at each end portion of the head units 12, 13 and 14, the threshold values from the basic dither matrix circuit 24 are selected by the selector 26 and, therefore, the N-valued signal that is output from the comparator 21 is '2'. If the value corresponds to the two ink outlet ports at each end portion of the head units 12, 13 and 14, the threshold values from the basic dither matrix circuit 25 are selected by the selector 26 and therefore, the N-valued signal that is output from the comparator 21 is '1'.

Thus, if the input image signal corresponds to the two ink outlet ports 11 at each end portion of the head units 12, 13 and 14, the value of the N-valued signal is made smaller and the volume of the ink from the two ink outlet ports is reduced so as to lower the average optical density of the image area formed in accordance with the image signal, at a constant rate, by using the end portion dither matrix circuit 25. For this reason, unevenness of optical density caused by increase in the volume of the ink from the two ink outlet ports 11 at each end portion of the head units 12, 13 and 14 can be reduced.

Thus, in a simpler structure that additionally comprises only the end portion dither matrix 25 and the selector 26 than that of a conventional dither processing, switching the dither matrix circuits 24 and 25 is executed in accordance with the input image signal that corresponds or does not correspond to the two ink outlet ports 11 at each end portion of the head units 12, 13 and 14. The unevenness of optical density generated in each end portion area of the head units 12, 13 and 14 can be thereby reduced and the image quality can be improved. In addition, the processing rate will not be changed since the same processing as the conventional dither processing is basically executed.

In the present embodiment, the end portion dither matrix circuit 25 forms each dither matrix of the basic dither matrix circuit 24 by adjusting the threshold value at the position of the lower left corner when the dither matrix is divided into four blocks having a size of 2×2. The basic dither matrix circuit 24 is arranged such that the magnitude of the matrix having the size of 4×4 becomes larger in accordance with the increase in the input image signals.

The end portion dither matrix circuit 25 corrects the dots in the high-frequency arrangement where one group having a size of 4×4 becomes larger to keep continuity with areas other than the end portions but is hardly noticeable to human eyes, on the basis of the relationship between the input image signal and the actual optical density of printing, and can thereby correct the unevenness of optical density at the end portions without a visible sense of incongruity.

The arrangement of the threshold values in the basic dither matrix circuit is not limited to that of the present embodiment. Also, the position and quantity of correction of the end portion dither matrix circuit may be adjusted in response to the degree of the unevenness of optical density.

In addition, the number of the ink outlet ports where the unevenness of optical density occurs, at each end portion of the head units, has been set at two in the present embodiment, but is not limited to this. Even if the number of the ink outlet ports is one or more than three, the unevenness of optical density can be solved by varying the size of the dither matrix.

The present embodiment has assumed a case where the same recording paper is fed to the ink jet head at only one time to finish the printing of one page. However, the present invention is not limited to this, and can be applied to a printer of feeding the same recording paper to the ink jet head at T times (T≧2), shifting the ink jet head by 1/T of the distance between the ink outlet ports in the line direction every time the recording paper is fed, and thereby executing the printing at the resolution set by multiplying the distance between the ink outlet ports of the ink jet head by T times. In this case, the same correction can be executed by multiplying the size of the dither matrix of the used end portion dither matrix circuit by T times in the line direction.

(Second Embodiment)

An ink jet head used in the present embodiment is the same as that in the first embodiment.

The fundamental concept of the present embodiment is to convert the input image signal into an N-valued signal and correct the image signal corresponding to the two ink outlet ports at the end portion of the head unit.

Figures 8, 9A, 9B:
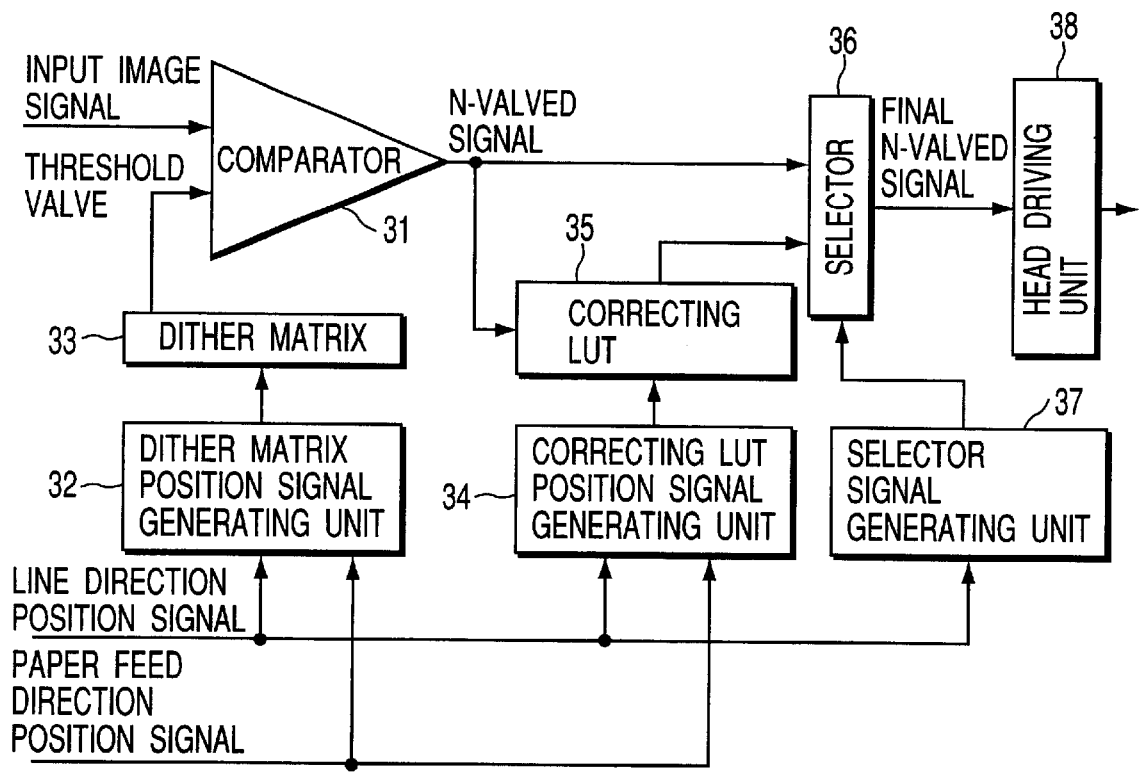
FIG. 8 is a block diagram showing a circuit arrangement of the pseudo-halftone processing unit and a gradation correction unit in a second embodiment of the present invention.
FIGS. 9A and 9B are views showing arrangement of look-up tables of a correction LUT in the second embodiment.
Figure 10:
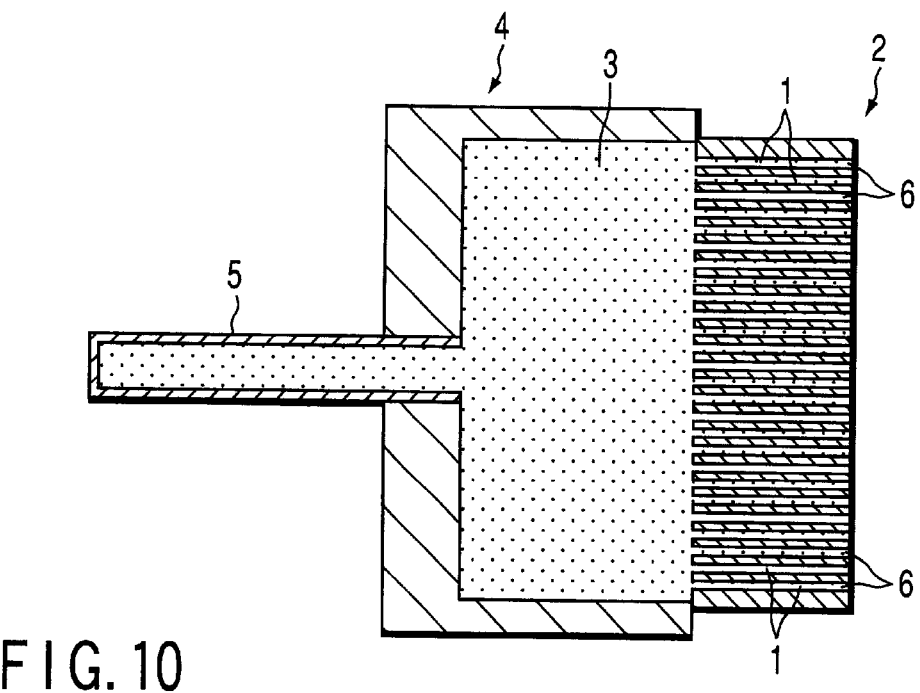
FIG. 10 is a sectional view showing an example of the structure of the ink jet head unit.
Figure 11:
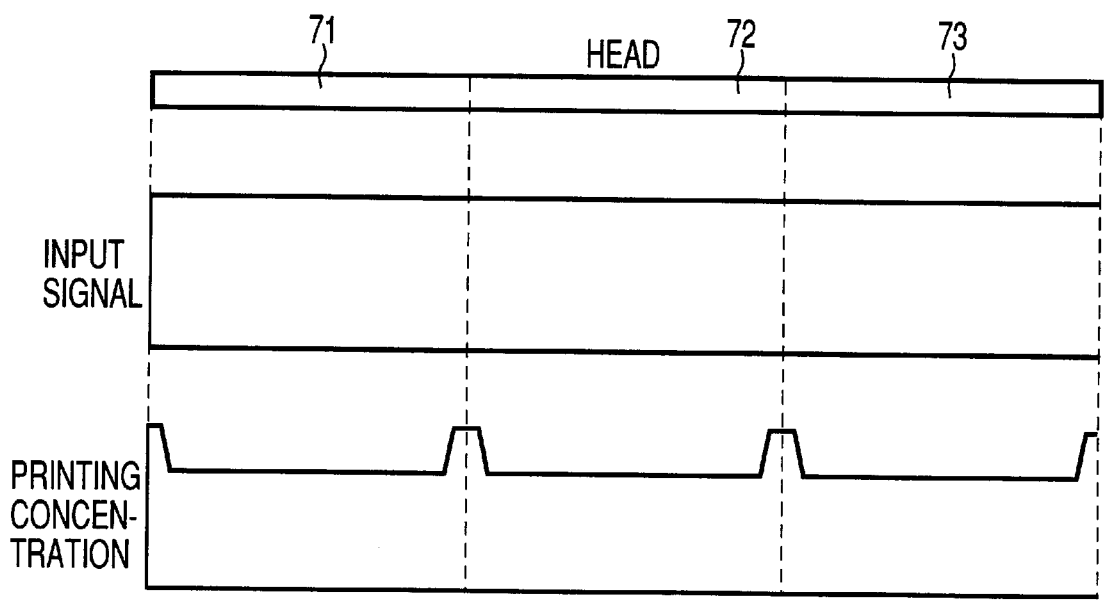
FIG. 11 is a view to explain the problems of a conventional ink jet head.

FIG. 8 is a view showing the arrangement of a pseudo-halftone processing unit for converting the input image signal of M gradation into a N-valued signal (M>N), for example, a five-valued signal of 0, 1, 2, 3 and 4, and a gradation correcting unit for correcting the five-valued signal after subjected to the pseudo-halftone processing. Reference numeral 31 denotes a comparator for comparing the input image signal with a threshold signal and outputting an N-valued signal. 32 is a dither matrix position signal generating unit for inputting the line direction position signal and paper feed direction position signal and outputting a dither matrix position signal that represents the position in the dither matrix. 33 is a dither matrix circuit for determining a threshold signal to be output in accordance with the dither matrix position signal from the dither matrix position signal generating unit 32 and supplying the determined threshold signal to the comparator 31. These circuits constitute the pseudo-halftone processing unit.

In addition, reference numeral 34 denotes a correcting LUT position signal generating unit for inputting the line direction position signal and the paper feed direction position signal, determining whether or not the pixel of interest corresponds to the ink outlet ports at the end portion to be corrected, and, if the pixel corresponds thereto, generating a correcting LUT position signal that represents the position in a correcting LUT (look-up table) 35 corresponding to the pixel of interest. The correcting LUT 35 converts the N-valued signal from the comparator 31 in accordance with the correcting LUT position signal from the correcting LUT position signal generating unit 34 and outputs a corrected N-valued signal. 36 is a selector for selecting the N-valued signal from the comparator 31 or the corrected N-valued signal from the correcting LUT 35 as a final N-valued signal. 37 is a selector signal generating unit for inputting the line direction position signal, determining whether or not the position of the image signal corresponds to the ink outlet port to be corrected, allowing the selector 36 to select the corrected N-valued signal from the correcting LUT 35 if the position of the image signal corresponds thereto, and outputting a selector signal to allow the selector 36 to select the N-valued signal from the comparator 31 if the position of the image signal corresponds to other positions. 38 is a head driving unit for driving the ink jet head 16 in accordance with the final N-valued signal that is output from the selector 36.

The correcting LUT position signal generating unit 34, the correcting LUT 35, the selector 36 and the selector signal generating unit 37 constitute the gradation correcting unit.

The correcting LUT 35 consists of a first look-up table 41 shown in FIG. 9A and a second look-up table 42 shown in FIG. 9B when, for example, the pseudo-halftone processing unit for converting the input image signal of M gradation into a five-valued signal is used. The first look-up table 41 converts the correcting LUT position signal into three intermediate signals '0', '1' and '2', and the second look-up table 42 converts the five-valued signals from the comparator 31 into the correction five-valued signals in accordance with the intermediate signals.

For example, if the pixel of interest is positioned at the lower left corner of the first look-up table 41, the intermediate signal from the first look-up table 41 is '1', and the second look-up table 42 outputs corrected N-valued signals in accordance with the intermediate signal values and the values 0 to 4 of the N-valued signals from the comparator 31. That is, in a case where the intermediate signal is '1', if the N-valued signal is '0', the corrected N-valued signal is also '0'. If the N-valued signal is '1', the corrected N-valued signal is also '1'. If the N-valued signal is '2', the corrected N-valued signal is '1'. If the N-valued signal is '3', the corrected N-valued signal is '2'. If the N-valued signal is '4', the corrected N-valued signal is '3'.

In this arrangement, first, the input image signal is compared with the threshold signal from the dither matrix circuit 33 by the comparator 31 and is converted into the N-valued signal, i.e. the five-valued signal. On the other hand, the correcting LUT position signal generating unit 34 inputs the line direction position signal and the paper feed direction position signal. When the position of the pixel of interest corresponds to the ink outlet ports of the end portion to be corrected, the correcting LUT position signal generating unit 34 generates a correcting LUT position signal that represents the position inside the correcting LUT 35 corresponding to the pixel of interest and supplies it to the correcting LUT 35.

The correcting LUT 35 executes conversion of the N-valued signal from the comparator 31 in accordance with the correcting LUT position signal and outputs the corrected N-valued signal. When the position of the pixel of interest corresponds to the ink outlet ports of the end portion to be corrected, the selector 36 selects the corrected N-valued signal from the correcting LUT 35 in accordance with the selector signal from the selector signal generating unit 37 and outputs it as the final N-valued signal. When the position of the pixel of interest is not that other than the positions corresponding to the ink outlet ports of the end portion to be corrected, the selector 36 selects a non-corrected N-valued signal from the comparator 31 in accordance with the selector signal from the selector signal generating unit 37 and outputs it as the final N-valued signal.

With this operation, if the input image signal corresponds to the two ink outlet ports at each end portion of the head units that constitute the ink jet head, the value of the N-valued signal is corrected by using the correcting LUT 35 and the volume of the ink from the two ink outlet ports is thereby reduced so as to lower at a constant rate the average optical density of the image area formed in accordance with this image signal. Therefore, even in the present embodiment, the unevenness of the optical density caused by the increase in the volume of the ink from the two ink outlet ports at each end portion of the head units can be reduced and thereby the image quality can be improved.

In the above-described first and second embodiments, the image signal corresponding to P number of ink outlet ports at each end portion of the head units is corrected. However, the image signal corresponding to an arbitrary number of ink outlet ports on the head units may be corrected.

In the embodiments, the second look-up table 42 executes correction with two kinds of characteristics (in which the intermediate signal is 1 and 2) as for the four portions (in which the intermediate signal is other than 0) of the first look-up table 41. However, an optimum value may be set at an arbitrary position in accordance with the number of the ink outlet ports to be corrected and the rate of the optical density variation for every gradation, and the size of the look-up tables is not limited to that in the embodiments.

In the embodiments, two look-up tables are used. However, the embodiments are not limited to this, and a single look-up table may be used.

In the embodiments, the halftone processing based on the dither method using the dither matrix as the pseudo-halftone processing unit is described. However, the present invention is not limited to this, and other halftone processings such as error diffusion may be executed.

In the embodiments, the number of the ink outlet ports where the unevenness of optical density, at the end portion of the head units, is set at two. However, the embodiments are not limited to this. Even if the number of the ink outlet ports is one or more than three, the problem can be solved by changing the size of the look-up tables in accordance with the number of the ink outlet ports.

In addition, in the embodiments, it is assumed that the same recording paper is fed at only one time for the ink jet head and then printing of one page is completed. However, the embodiments are not limited to this, and can be applied to a printer for feeding the same recording paper at T times (T≧2) for the ink jet head, allowing the ink jet head to be moved in the line direction by 1/T of the distance between the ink outlet ports every time the recording paper is fed, and thereby executing the printing at the resolution which is set by multiplying the distance between the ink outlet ports of the ink jet head by T. In this case, the same correction can be executed by multiplying the dimension of the used first look-up table by T in the line direction.

In each of the above-described embodiments, one ink jet head is constituted by arranging three head units, but is not limited to this. Two or more than four head units may be arranged or only one head unit may be used, to constitute one ink jet head.

In a case where the ink jet head is constituted by only one head unit, however, unevenness of optical density occurring at the ink outlet ports at the end portions of the ink jet head will not be a serious problem and, rather, unevenness of optical density at specific ink outlet ports, caused by irregularity of the ink outlet ports generated in the production of the ink jet head, will become a problem. Therefore, in this case, the positions of specific ink outlet ports may be recognized in advance by tests and then the same correction may be executed for the image signal corresponding to the ink outlet ports whose positions have been recognized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ink jet recording apparatus comprising:

an ink jet head formed by integrally arranging a plurality of head units each having a large number of ink outlet ports aligned, so that the ink outlet ports in each of the head units can be arranged approximately parallel;

a pseudo-halftone processing unit for converting an image signal of M gradation into an image signal of N (M>N) gradation by using dither matrix, so that average optical density of an image area formed in accordance with an image signal corresponding to P (P≧1) number of ink outlet ports at each end portion of the head units constituting the ink jet head can be substantially equivalent to average optical density of an image area formed in accordance with an image signal corresponding to ink outlet ports other than the P number of ink outlet ports; and driving means for driving the ink jet head in accordance with the image signal of N gradation that is output from the pseudo-halftone processing unit, while moving a recording medium in a direction orthogonal with a line direction in which the ink outlet ports of the ink jet heads are aligned, relatively to the ink jet head.

2. An ink jet recording apparatus according to claim 1, wherein the pseudo-halftone processing unit is constituted by:

a first dither matrix corresponding to P (P≧1) number of ink outlet ports at each end portion of the head units;

a second dither matrix corresponding to ink outlet ports other than the P number of ink outlet ports;

a position signal generating unit for generating position signals of the first and second dither matrix in accordance with a line direction position signal and a paper feed direction position signal;

a selection signal generating unit for inputting the line direction position signal, determining whether or not a pixel is at the end portion, and outputting a selection signal;

a selector for outputting a threshold value of the first dither matrix or the second dither matrix in accordance with the selection signal; and a comparator for comparing the threshold value output from the selector with the image signal of M gradation, and outputting the image signal of N gradation.

3. An ink jet recording apparatus according to claim 2, wherein the threshold value of the first dither matrix is set to be higher in frequency than the threshold value of the second dither matrix.

4. An ink jet recording apparatus comprising:

an ink jet head formed by integrally arranging a plurality of head units each having a large number of ink outlet ports aligned, so that the ink outlet ports in each of the head units can be arranged approximately parallel;

a pseudo-halftone processing unit for converting an image signal of M gradation into an image signal of N (M>N) gradation;

a gradation correcting unit for correcting the image of N gradation that is output from the pseudo-halftone processing unit; and driving means for driving the ink jet head in accordance with the image signal of N gradation that is output from the pseudo-halftone processing unit, while moving a recording medium in a direction orthogonal with a line direction in which the ink outlet ports of the ink jet heads are aligned, relatively to the ink jet head, wherein the gradation correcting unit makes average optical density of an image area formed in accordance with an image signal corresponding to P (P≧1) number of ink outlet ports at each end portion of the head units constituting the ink jet head, substantially equivalent to average optical density of an image area formed in accordance with an image signal corresponding to ink outlet ports other than the P number of ink outlet ports.

5. An ink jet recording apparatus according to claim 4, wherein the gradation correcting unit is constituted by:

a look-up table for correcting the image signal of N gradation that is output from the pseudo-halftone processing unit;

a position signal generating unit for generating a position signal to designate a position of the look-up table in accordance with a line direction position signal and a paper feed direction position signal;

a selector signal generating unit for determining whether a position of the image signal corresponds to an ink outlet port to be corrected, in accordance with the line direction position signal; and a selector for selectively outputting the image signal of N gradation that is output from the pseudo-halftone processing unit or the corrected image signal of N gradation that is output from the look-up table, in accordance with a selector signal.

6. An ink jet recording apparatus according to claim 5, wherein the look-up table is constituted by a first look-up table and a second look-up table;

the position signal is converted into intermediate signals by the first look-up table; and the second look-up table comprises a plurality of tables for outputting different image signals of N gradation in accordance with the intermediate signals that are output from the first look-up table.

7. An ink jet recording apparatus according to claim 4, wherein the pseudo-halftone processing unit converts the image signal of M gradation into the image signal of N (M>N) gradation by using dither matrix.

8. An ink jet recording apparatus according to claim 4, wherein the pseudo-halftone processing unit converts the image signal of N gradation into the image signal of N (M>N) gradation by using error diffusion.

* * * * *